United States Patent [19]

Martin

[11] 4,317,220

[45] Feb. 23, 1982

[54] SIMULCAST TRANSMISSION SYSTEM

[76] Inventor: André Martin, 1040 Pellerin St., Brossard, Prov. of Quebec, Canada, J4W 2L3

[21] Appl. No.: 9,452

[22] Filed: Feb. 5, 1979

[51] Int. Cl.$^3$ .......... H04B 1/40

[52] U.S. Cl. .......... 455/58; 455/53; 455/72; 455/76; 358/149

[58] Field of Search .......... 455/49, 51, 56, 57, 455/53, 54, 58, 72, 76, 112, 132, 16, 136; 340/291, 299, 311; 358/148, 149; 375/107, 120

[56] References Cited

U.S. PATENT DOCUMENTS 2,868,963 1/1959 McMillan .......... 455/72
3,020,352 2/1962 Jager .......... 455/72
3,118,111 1/1964 Miller .......... 455/16
3,377,559 4/1968 Stewart .......... 455/72
3,927,373 12/1975 Janssens .......... 455/51
4,119,912 10/1978 Nagy .......... 375/107
4,255,814 3/1981 Osborn .......... 455/51

*Primary Examiner*—Jin F. Ng
*Assistant Examiner*—Tommy P. Chin

[57] ABSTRACT

A simulcast transmission system is disclosed. The system comprises a master station including means for generating and transmitting over a medium an audio signal containing a message signal and a pilot frequency signal inserted into the audio signal band, and at least two slave stations adapted to receive the audio signal transmitted over the medium and including a radio frequency generator of the phase locked loop type and means for isolating the pilot frequency signal from the audio signal and for synchronizing the frequency of the radio frequency generator with such pilot frequency signal.

3 Claims, 4 Drawing Figures

"SLAVE"

"SLAVE"

SIMULCAST TRANSMISSION SYSTEM

This invention relates to a simulcast transmission system.

BACKGROUND OF THE INVENTION

To improve the range of a commercial FM transmitter station in hilly regions, it is known to use several transmitting stations operating at the same frequency which are located at critical locations. However, the operation of a network of transmitters each using a separate conventional pilot oscillator is almost impossible since the frequency drift between the oscillators is so great that it is impossible to keep the transmitters operating at the same frequency more than a few seconds. High stability oscillators must absolutely be used. However, these oscillators are very expensive and, more importantly, after having been adjusted in frequency one with respect to the other, start immediately to drift apart slightly in frequency so that, after a few months of operation, frequency netting must be done by a competent technician. Thus, although high stability oscillators are excellent on a short term basis, they are still deficient over long periods of time.

The result of such frequency drift is a low frequency beat between two neighboring transmitting stations which is sensed by a receiver located within the broadcasting range of the two transmitting stations. The signal received is hampered by such low frequency beat and, as the drift increases, the message becomes unintelligible. Then, frequency netting of the transmitting stations must be done. This operation is expensive and add to the maintenance of the network.

SUMMARY OF THE INVENTION

It is therefore the object of the present invention to provide a simulcast transmission system using radio frequency transmitters which are locked on a common pilot frequency source thereby ensuring a permanent synchronization between the transmitters and thus no drift. This will ensure optimum quality reception in all locations between two or more transmitters. In addition, this will also eliminate the periodical frequency nettings which are required even with the use of high stability oscillators. The simulcast transmission system, in accordance with the invention, comprises a master station including means for generating and transmitting over a medium an audio signal containing a message signal and a pilot frequency signal inserted into the audio signal band, and at least two slave stations adapted to receive the audio signal transmitted over the medium and including a radio frequency generator of the phase locked loop type and means for isolating the pilot frequency signal from the audio signal and for synchronizing the frequency of the radio frequency generator with such pilot frequency signal.

The pilot frequency generating means preferably comprises a crystal controlled oscillator, a frequency divider connected to the output of the crystal controlled oscillator for generating the pilot frequency signal and a band pass filter for eliminating the harmonics of the pilot frequency signal. The means for generating the audio signal preferably comprises a compressor amplifier for limiting the amplitude and frequency band of the message signal within predetermined limits, a notch filter connected to the output of the compressor amplifier for withdrawing from the message signal all frequencies substantially equal to the pilot frequency signal thus creating a protected audio band slot, a mixer for inserting the pilot frequency signal into the protected audio band slot, and an output amplifier for adjusting the level of the audio signal depending on the medium it is transmitted through.

The above mentioned means for isolating the pilot frequency signal from the audio signal in the slave stations preferably comprises a band pass filter for filtering the pilot frequency signal from the audio signal, a Schmitt trigger connected to the output of the band pass filter for generating a square wave signal corresponding to the frequency of the pilot frequency signal and applying such square wave signal to a phase locked loop radio frequency generator.

A compressor amplifier is preferably connected at the input of the slave station ahead of the band pass filter and an amplitude detector is connected between the output of the band pass filter and the compressor amplifier for controlling the amplitude of the pilot frequency signal. The phase locked radio frequency generator preferably comprises a voltage controlled oscillator generating a carrier frequency signal which is a predetermined multiple of the pilot frequency signal, a frequency divider connected to the output of the voltage controlled oscillator for providing an output signal corresponding to the frequency of the pilot frequency signal, a phase detector connected to the frequency divider and to the Schmitt trigger for comparing the phase of the output signal of the frequency divider with that of the pilot frequency signal, and an integrator connected to the output of the phase detector for generating a d.c. voltage corresponding to the phase difference between the output signal of the frequency divider and that of the pilot frequency signal and applying such voltage to the voltage controlled oscillator for reducing the phase difference to zero.

The slave station also comprises a notch filter connected in parallel with the above mentioned band pass filter for withdrawing the pilot frequency signal from the audio signal transmitted by the master station to recover the message signal, a limiter connected to the output of the notch filter for limiting the frequency variations of the message signal within prescribed limits, a low pass filter connected to the output of the limiter to eliminate all frequencies of the message signal higher than 3000 Hz, and a modulator interconnecting the low pass filter and the voltage controlled oscillator for modulating the carrier frequency signal with the message signal.

A radio frequency amplifier is provided for connecting the output of the voltage controlled oscillator to a suitable antenna and a protection circuit is preferably connected between the phase detector and the radio frequency amplifier for preventing operation of the radio frequency amplifier when the phase difference sent by the phase detector indicates that the phase locked loop is unlocked. A delay line is connected at the input of each slave station except the furthest away (timewise) for compensating for the phase difference in propagation times of the audio signal between the master station and each of the slave stations.

BRIEF DESCRIPTION OF THE DRAWINGS

The invention will now be disclosed, by way of example, with reference to the accompanying drawings in which.

DESCRIPTION OF A PREFERRED EMBODIMENT

Figure 1:
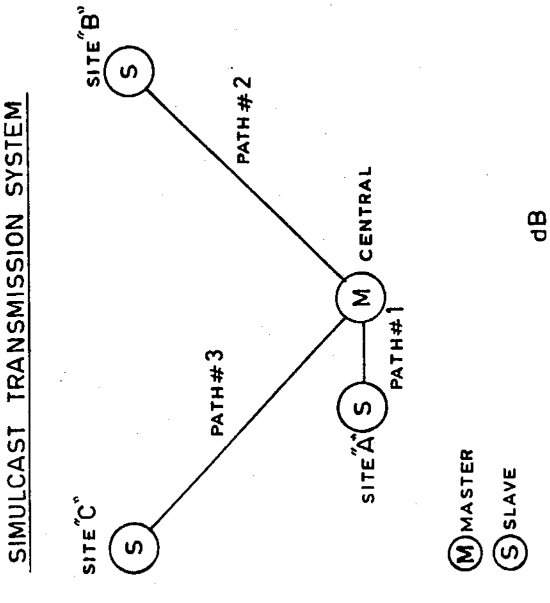
FIG. 1 illustrates a schematic diagram of a simulcast transmission system.

Referring to the drawings, there is shown in FIG. 1 a schematic diagram of a simulcast frequency modulation transmission system including a central master station M transmitting audio signals to slave stations S located on site A, site B and site C over path no. 1, path no. 2 and path no. 3, respectively.

Figure 2:
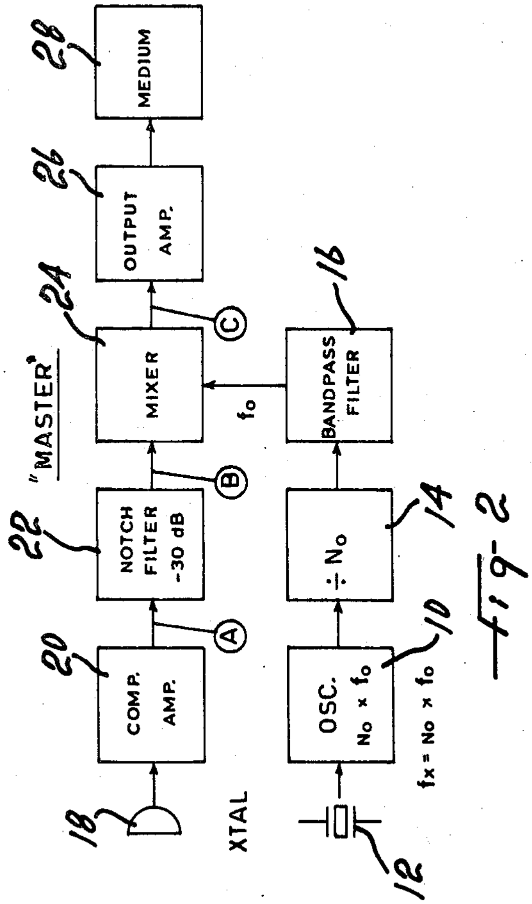
FIG. 2 illustrates a block diagram of the master station of the simulcast transmission system of FIG. 1.

FIG. 2 illustrates a block diagram of a master station which comprises an oscillator 10 controlled by piezoelectric quartz crystal 12 oscillating at a natural frequency $f_x$ and having a stability satisfying the F.C.C. regulations for the allotted radio frequency band. The frequency $f_x$ of the oscillator is selected as a multiple No of the pilot frequency signal $f_o$ of the master station. The output of the oscillator 10 is fed to a frequency divider 14 which divides the frequency $f_x$ of the oscillator by a series of digital logic circuits and the result of such operation is a square wave signal of frequency $f_o$. The output of the frequency divider is passed through a band pass filter 16 to eliminate the usual harmonic frequencies of a square wave signal and make pilot frequency signal $f_o$ sinusoidal. The pilot frequency $f_o$ is selected in the audio band 300–3000 Hz so as to be easily transmitted by media normally used for audio communications. On the other hand, the message signal to be transmitted is fed by means of a suitable transducer or microphone 18 to a compressor amplifier 20 which limits the information to a spectrum in the range of 300–3000 Hz as shown in diagram A of FIG. 4 of the drawings. The output of the compressor amplifier is applied to a notch filter 22 which withdraws from the audio message all frequencies at and adjacent to the pilot frequency $f_o$ to create a protected audio band slot as shown in diagram B of FIG. 4 of the drawings. This is necessary to eliminate interference of any audio frequencies at or near $f_o$ with the pilot frequency $f_o$ as it will be seen more clearly in the description of the slave station. The notch filter must therefore attenuate the audio signals at frequency $f_o$ by at least 30 dB, preferably about 40 dB.

A mixer 24 is connected to the notch filter 22 and to the band pass filter 16 to insert the pilot frequency signal $f_o$ into the protected audio band slot created by the notch filter. This is illustrated in diagram C of FIG. 4 of the drawings. The level of the pilot frequency $f_o$ is adjusted in the mixer 24 so as to be about $-20$ dB of the maximum amplitude of the message signal. The output of the mixer is fed to an output amplifier 26 which sets the output of the master station according to the particular transmission medium 28 used such as telephone cables, radio links, lazer or optical fibers. Thus, the transmission medium carries both the message and the pilot frequency $f_o$ to the slave stations.

It is important to note here that the pilot frequency must not be located at the lower end of the audio band because the notch filter would substantially deteriorate the quality of any voice signals transmitted by the system. The frequency $f_o$ is preferably at the upper end of the audio band in the frequency range of 1800–3000 Hz.

Figure 4:
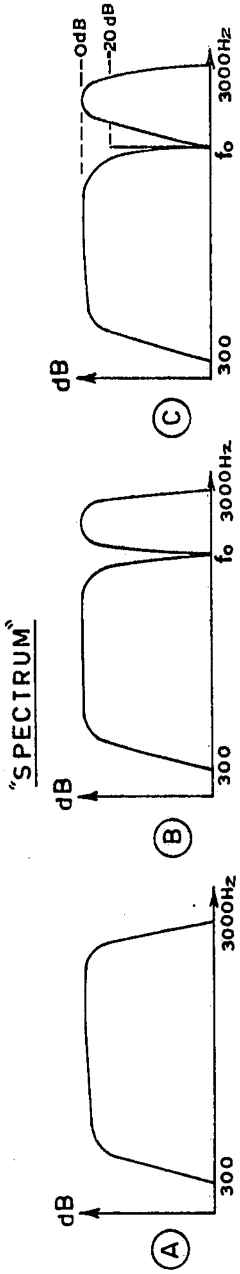
FIG. 4 illustrates various diagrams of the spectrum appearing at various locations of the master and slave stations.

FIG. 4 illustrates a block diagram of a suitable slave station. The signal transmitted by the medium 28 is fed to a compressor amplifier 30 which is controlled in amplitude and frequency as it will be disclosed later. The output of the compressor amplifier is applied either directly or through a delay line 32 to a notch filter 34 and a band pass filter 36 to separate the message signal from the pilot frequency signal $f_o$. Before discussing the notch filter 34 and the band pass filter 36 in detail, let us say a few words about the delay line 32. The delay line may be inserted at the input of the slave station either after or ahead of the compressor amplifier 30 to insert transmission delays in the case of slave stations which are located close (timewise) to the master station because it is very important that all slave transmitters be modulated by an audio signal having exactly the same phase at a given time otherwise a receiver located between two stations would reproduce message signals highly distorted. To eliminate the phase problems between the modulators of the slave stations caused by the propagation delays of the medium, the slave station having the longest propagation time is determined. If we assume that the medium is a radio link, it will be the station located on site C in FIG. 1 of the drawings. This station will not require any delay line and the propagation time for that station will be established as a reference. The propagation time of the slave stations located on sites A and B will also be determined and delay lines of predetermined values will be installed at the input of these slave stations depending on the difference between the propagation time of each of these stations with respect to the station located on site C. Thus, the difference in propagation times between each of the slave stations and the master station are effectively compensated and all transmitters are modulated by a signal having the same phase.

The use of a notch filter 34 operating at the pilot frequency $f_o$ permits to substantially remove the pilot frequency $f_o$ which was inserted in the audio band by the master station and which would obviously interfere with the reception of the signal received by a radio receiver receiving the signal transmitted by the slave transmitter. The attenuation of the notch filter should be at least 30 dB preferably about 40 dB. Thus, the pilot frequency $f_o$ which was transmitted at a level of $-20$ dB with respect to the message signal is now at least $-50$ dB with respect to the message signal.

On the other hand, band pass filter 36 permits to recuperate the pilot frequency $f_o$. The output of the band pass filter is applied to an amplitude detector 38 which is itself connected to the compressor amplifier 30 to control the output of the compressor amplifier so as to ensure a predetermined stability in the amplitude of the pilot frequency signal $f_o$. The output of the band pass filter 36 is also applied to a Schmitt trigger 40 to change the sinusoidal shape of the wave form $f_o$ into a square wave.

The square wave pilot frequency signal $f_o$ is applied to a phase locked loop radio frequency generator including a voltage controlled oscillator 42, a frequency divider 44, a phase detector 46 and an integrator 48. The voltage controlled oscillator generates the radio frequency $f_c$ of the slave station which is a multiple N of the pilot frequency $f_o$. The output of the voltage controlled oscillator is applied (through a buffer 50 to be further disclosed later) to the frequency divider 44 which divides the frequency of the signal by a factor N such that the frequency of the signal at the output of divider 44 is the same as the pilot frequency $f_o$. The phase of the signal appearing at the output of the divider 44 is compared with the phase of the pilot signal $f_o$ in phase detector 46. The phase difference between the two signals applied to the phase detector is fed to integrator 48 which generates a d.c. voltage proportional to such phase difference and applies it to the voltage controlled oscillator to reduce the phase difference to zero. The phase locked loop thus maintains the output of the slave transmitter locked to the pilot frequency $f_o$ generated in the master station. When plural slave transmitters are used, everyone will be locked to the same pilot frequency $f_o$ generated by the master station and there will be absolutely no phase shift between the slave transmitters.

The message signal appearing at the output of notch filter 34 is fed to a limiter 52 which limits the frequency deviations to conform to the F.C.C. regulations. The output of the limiter 52 is applied to a low pass filter 54 to eliminate all frequencies above 3000 Hz. The signal appearing at the output of the low pass filter 54 is fed to the voltage controlled oscillator through a modulator 56 such as a varactor diode. The frequency modulation thus obtained is of the direct FM type.

The modulated output signal of the volage controlled oscillator is fed to a radio frequency amplifier 58 through buffer 50. Buffer 50 is a conventional amplifier used to isolate the output of the voltage controlled oscillator from the effects of the load impedance variations in the amplifier stages. The output of the radio frequency amplifier 58 is fed to a final amplifier 60 which is connected to a suitable antenna 62.

The slave transmitter is also provided with protection circuit 64 interconnecting the phase detector 46 and the radio amplifier 58 to disable the amplifier when the phase detector senses that the phase locked loop is unlocked.

Figure 3:
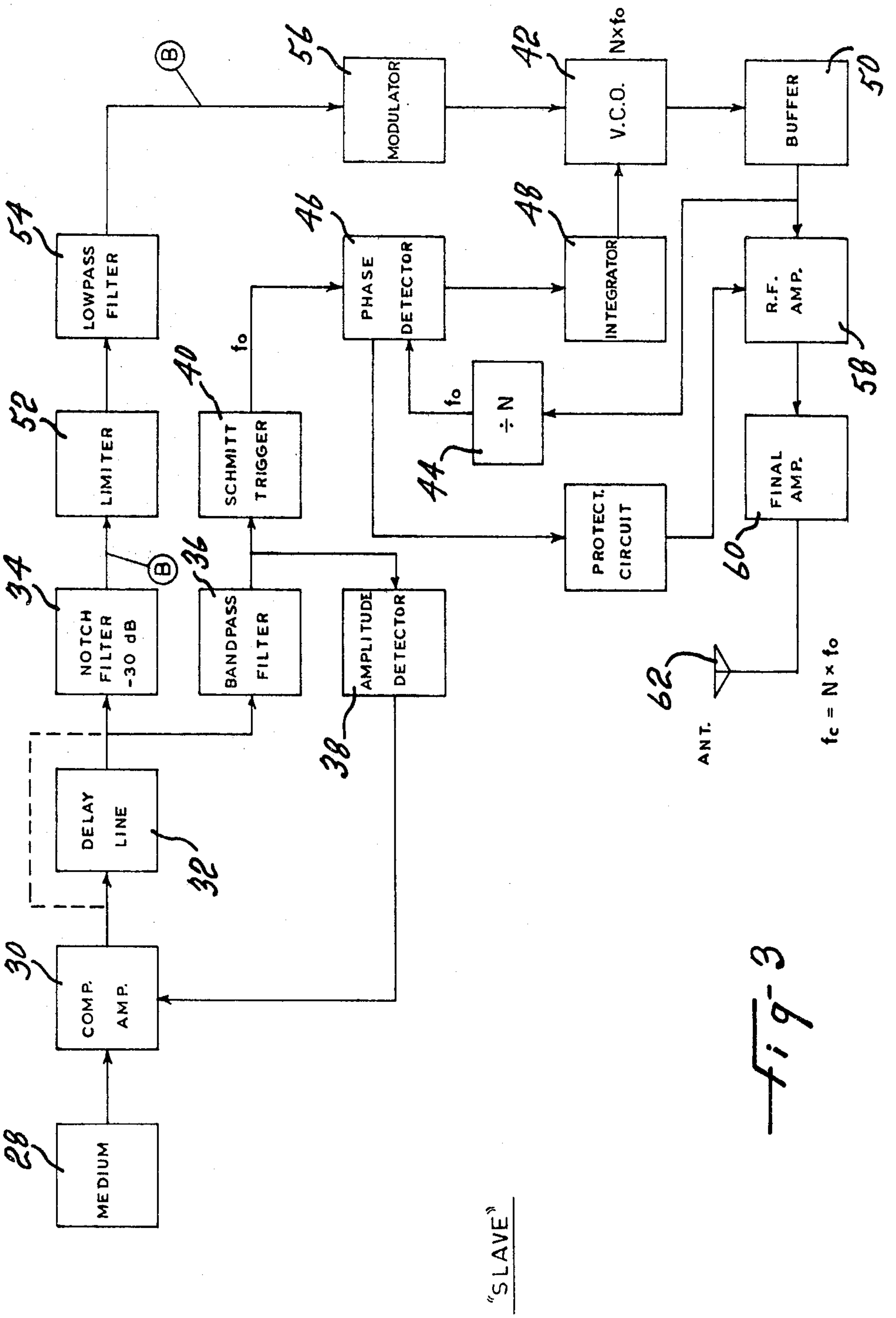
FIG. 3 illustrates a block diagram of the slave station of the simulcast transmission system of FIG. 1.

The pilot frequency is advantageously as high as possible in the audio band 300–3000 Hz to reduce to a minimum any interference with the message signal and also to minimize any frequency jitter effect. In addition, it is particularly useful to make $f_o$ equal to 2500 Hz since 2.5 KHz is an exact sub-multiple of 20 KHz, 30 KHz and 25 KHz which are the regular channel spacings for the LB, VHF and UHF bands. Thus, 2500 Hz can be used with advantage to pilot transmitters operating in all the commercial radio frequency bands of the F.M. type. This greatly simplifies the construction of the frequency divider 44 which is required to divide the frequency $f_o$ to correspond to the frequency of the pilot frequency $f_o$. All the blocks shown in the circuit diagrams of FIGS. 2 and 3 represent conventional electronic components and it is therefore not needed to disclose them in detail.

Although the invention has been disclosed with reference to a preferred embodiment, it is to be understood that it is not limited to such embodiment and that alternatives are also envisaged.

What I claim is:

1. A simulcast transmission system comprising:

(a) a master station including means for generating and transmitting over a medium an audio signal containing a message signal and means for generating a pilot frequency signal inserted into the audio signal band, said means for generating a pilot frequency signal comprising a precision oscillator, a frequency divider connected to the output of said precision oscillator for generating said pilot frequency signal and a band pass filter for eliminating the harmonics of said pilot frequency signal, and wherein the means for generating said audio signal further comprises a compressor amplifier for limiting the amplitude and frequency band of said message signal within predetermined limits, a notch filter connected to the output of said compressor amplifier for withdrawing from said message signal all frequencies substantially equal to said pilot frequency signal thus creating a protected audio band slot, a mixer for inserting said pilot frequency signal into said protected audio band slot, and an output amplifier for testing the level of the audio signal depending on the medium it is transmitted through; and (b) at least two slave stations adapted to receive the audio signal transmitted over said medium and each including a radio frequency generator of the phase locked loop type and means for isolating the pilot frequency signal from the audio signal and for synchronising the frequency of the radio frequency generator with said pilot frequency signal, wherein said last named means comprises a band pass filter for filtering said pilot frequency signal from the audio signal, a square wave generator connected to the output of said band pass filter for generating a square wave signal corresponding to the frequency of said pilot frequency signal and applying it to the phase locked loop radio frequency generator, the latter comprising a voltage controlled oscillator generating a carrier frequency signal which is a predetermined multiple of said pilot frequency signal, a frequency divider connected to the output of said voltage controlled oscillator for providing an output signal corresponding to the frequency of said pilot frequency signal, a phase detector conntected to said frequency divider and to said square wave generator for comparing the phase of the output signal of said frequency divider with that of said pilot frequency signal, an integrator connected to the output of said phase detector for generating a D.C. voltage corresponding to the phase difference between the output signal of the frequency divider and that of the pilot frequency signal and applying said voltage to said voltage controlled oscillator for reducing said phase difference to zero, a notch filter connected in parallel with said band pass filter for withdrawing the pilot frequency signal from the audio signal transmitted by the master station to recover the message signal, a limiter connected to the output of the notch filter for limiting the frequency variations of the message signal within prescribed limits, a low pass filter connected to the output of the limiter to eliminate all frequencies of the message signal higher than 3000 Hz, and a modulator interconnecting the low pass filter and the voltage controlled oscillator for modulating the carrier frequency signal with the message signal; and (c) a delay line connected to the input of each slave station for compensating for the difference in propagation times of the audio signal between the master station and each of the slave stations.

2. A simulcast transmission system as defined in claim 1, further comprising a compressor amplifier connected at the input of the slave station ahead of said band pass filter, and an amplitude detector interconnecting the output of said band pass filter and said compressor amplifier for controlling the amplitude of the pilot frequency signal.

3. A simulcast transmission system as defined in claim 1, further comprising a radio frequency amplifier interconnecting the output of the voltage controlled oscillator to a suitable antenna, and a protection circuit interconnecting the phase detector and the radio frequency amplifier for preventing operation of the radio frequency amplifier when the phase detector senses that the phase locked loop is unlocked.

* * * * *